US012597665B2

(12) United States Patent
Kim

(10) Patent No.:  US 12,597,665 B2
(45) Date of Patent:       Apr. 7, 2026

(54) BATTERY PACK AND BATTERY CELLS MOUNTED TO THE BATTERY PACK

(71) Applicants: Hyundai Motor Company, Seoul (KR); Kia Corporation, Seoul (KR)

(72) Inventor: Kyung Mo Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 666 days.

(21) Appl. No.: 17/971,902

(22) Filed: Oct. 24, 2022

(65) Prior Publication Data

US 2023/0378585 A1      Nov. 23, 2023

(30) Foreign Application Priority Data

May 19, 2022     (KR) ........................ 10-2022-0061525

(51) Int. Cl.
| | |
|---|---|
| *H01M 6/42* | (2006.01) |
| *H01M 50/244* | (2021.01) |
| *H01M 50/249* | (2021.01) |
| *H01M 50/291* | (2021.01) |
| *H01M 50/507* | (2021.01) |

(52) U.S. Cl.
CPC ....... *H01M 50/244* (2021.01); *H01M 50/249* (2021.01); *H01M 50/291* (2021.01); *H01M 50/507* (2021.01); *H01M 2220/20* (2013.01)

(58) Field of Classification Search
CPC ............. H01M 50/244; H01M 50/249; H01M 50/507; H01M 50/509; H01M 50/505; H01M 50/291; H01M 50/293; H01M 2220/20
See application file for complete search history.

(56) References Cited

U.S. PATENT DOCUMENTS

2020/0411823 A1 * 12/2020 Heckert .............. H01M 50/209

FOREIGN PATENT DOCUMENTS

KR      10-2019-0066874 A      6/2019

* cited by examiner

*Primary Examiner* — Raymond Alejandro
(74) *Attorney, Agent, or Firm* — Morgan, Lewis & Bockius LLP

(57) ABSTRACT

A battery pack for a vehicle includes a pack tray with an open upper surface, a plurality of battery cells stacked in a vertical direction on the pack tray, a plurality of sensing blocks, each including a cell bus-bar connected to an electrode of each of the battery cells, and provided on the pack tray, and a pressure plate mounted to press upper surfaces of the stacked battery cells in a downward direction, wherein the pack tray includes a plurality of support members fixing the plurality of sensing blocks, and wherein the pressure plate is fixed to the support members with the plurality of sensing blocks and is located above the plurality of sensing blocks.

12 Claims, 14 Drawing Sheets

FIG. 12

BATTERY PACK AND BATTERY CELLS MOUNTED TO THE BATTERY PACK

CROSS REFERENCE TO RELATED APPLICATION

The present application claims priority to Korean Patent Application No. 10-2022-0061525, filed May 19, 2022, the entire contents of which is incorporated herein for all purposes by this reference.

BACKGROUND OF THE PRESENT DISCLOSURE

Field of the Present Disclosure

The present disclosure relates to a structure of a battery pack for a vehicle.

Description of Related Art

A battery pack mounted to a vehicle includes a plurality of battery modules, and each of the battery modules consists of a plurality of battery cells.

In other words, the plurality of battery cells are gathered to form each of the battery modules, and the battery pack including the plurality of battery modules is mounted to the vehicle, so that the vehicle may be supplied with required power.

However, a method in which the plurality of battery modules is described above and then is mounted to the battery pack causes reduction in the amount of battery cells actually mounted in the battery pack due to the configuration of each battery module and parts required for securing the rigidity thereof, negatively affecting on securing the mileage of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery pack for a vehicle, wherein battery cells are directly mounted to the battery pack to increase the actual amount of the mounted battery cells to increase the mileage of the vehicle.

Furthermore, the present disclosure is directed to providing a battery pack for a vehicle, the, wherein the battery pack is configured to secure easy assembly when battery cells are mounted on the battery pack, and to realize solid and stable mounting state of the battery cells.

In an aspect of the present disclosure, there is provided a battery pack for a vehicle, the battery pack including: a pack tray including an open upper surface; a plurality of battery cells stacked in a vertical direction on the pack tray; a plurality of sensing blocks, each including a cell bus-bar connected to an electrode of each of the battery cells, and provided on the pack tray; and a pressure plate mounted to press upper surfaces of the stacked battery cells in a downward direction thereof.

The cell bus-bar of each of the sensing blocks may include a plurality of cell bus-bars arranged in the vertical direction; and to prevent each of the cell bus-bars from interfering with the stacked battery cells, each of the cell bus-bars may be deformed into a horizontal direction from an upward bent state, and then be coupled to an electrode of each of the battery cells.

Among the cell bus-bars of each of the sensing blocks, a lowest cell bus-bar may be assembled to the pack tray in a horizontally protruding state without being bent upwards.

A spacer may be inserted between the cell bus-bars, which may be horizontally deformed and respectively coupled to the battery cells, to supply a support force in the vertical direction.

The plurality of sensing blocks may be arranged so that a pair of sensing blocks may be arranged at opposite end portions of two groups of the stacked battery cells, the two groups being arranged adjacent to each other; and the pair of sensing blocks may be configured to electrically connect the two groups of the battery cells to a pair of terminals, respectively.

Both the pair of terminals may be provided at any one of a pair of two sensing blocks among the plurality of sensing blocks.

A temperature sensor may be provided at least one of the pair of two sensing blocks to measure temperature of the plurality of battery cells.

A wiring member configured for transmitting an electrical signal may connect the pair of two sensing blocks to each other while being located therebetween.

The wiring member connecting the pair of two sensing blocks to each other may be a flexible printed circuit board (FPCB); and the pair of two sensing blocks may respectively include printed circuit boards (PCB) connected to the FPCB.

The pack tray may include: a plurality of support members fixing the plurality of sensing blocks; and the pressure plate may be fixed to the support members with the plurality of sensing blocks above the plurality of sensing blocks.

The pressure plate may include a metal plate; and insulation plates may be provided on a lower surface of the pressure plate to be in contact with the plurality of battery cells.

On the pack tray, to partition the stacked battery cells in a perpendicular direction to the support members, a plurality of partition plates and cooling channels may be alternately provided.

Insulation sheets may be attached to the partition plates of the pack tray; and a gap filler may be filled into a gap between the cooling channels and the battery cells.

a method for manufacturing a battery pack for a vehicle, the method including: loading a battery cell so that an electrode of the battery cell may be overlapped with an upper portion of a lowest cell bus-bar of a sensing block; welding the electrode of the battery cell to the lowest cell bus-bar; inserting a spacer into an upper side of the welded electrode; deforming a cell bus-bar directly located above the welded lowest cell bus-bar into a horizontal state; stacking another battery cell so that an electrode of the another battery cell may be overlapped with an upper portion of the horizontally deformed cell bus-bar; and welding the electrode of the stacked another battery cell to the cell bus-bars located below the another battery cell.

The processes from the inserting the spacer to the welding the electrode of the newly loaded another battery cell to the cell bus-bar below the another battery cell may be repeatedly performed in response to a number of battery cells to be stacked.

After the electrode of the battery cell is welded to a lower cell bus-bar and before a new battery cell is stacked, filling a gap filler between the battery cells with the welded electrode and cooling channels may be further performed.

The method may include: when welding all electrodes of additionally stacked battery cells to the cell bus-bars is completed, loading an assembly of the stacked battery cells and the sensing block on a pack tray; and fixing the sensing block to the pack tray.

The fixing the sensing block on the pack tray may be performed by, after a pressure plate provided to press the stacked battery cells in a downward direction is located above the battery cells, securely coupling a fixing bolt sequentially passing through the pressure plate and the sensing block to a support member of the pack tray.

Before the loading the battery cell so that the electrode of the battery cell is overlapped with the upper portion of the lowest cell bus-bar of the sensing block, loading the sensing block on the pack tray may be performed first.

When the welding all electrodes of the additionally stacked battery cells to the cell bus-bars is completed, after a pressure plate provided to press the stacked battery cells in a downward direction is located above the battery cells, a fixing bolt sequentially passing through the pressure plate and the sensing block may be securely coupled to a support member of the pack tray.

According to an exemplary embodiment of the present disclosure, the battery pack for a vehicle is configured so that the battery cells are directly mounted on the battery pack to increase the actual amount of the mounted battery cells, so that the mileage of the vehicle can increase.

Furthermore, according to an exemplary embodiment of the present disclosure, when the battery cells are mounted on the battery pack, it is possible to secure easy assembly and to realize solid and stable mounting state of the battery cells.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 12 is a view showing a process in order, in which an electrode of each of the battery cells is coupled to the cell bus-bar of the sensing block, and the battery cells are stacked;

Figure 1:
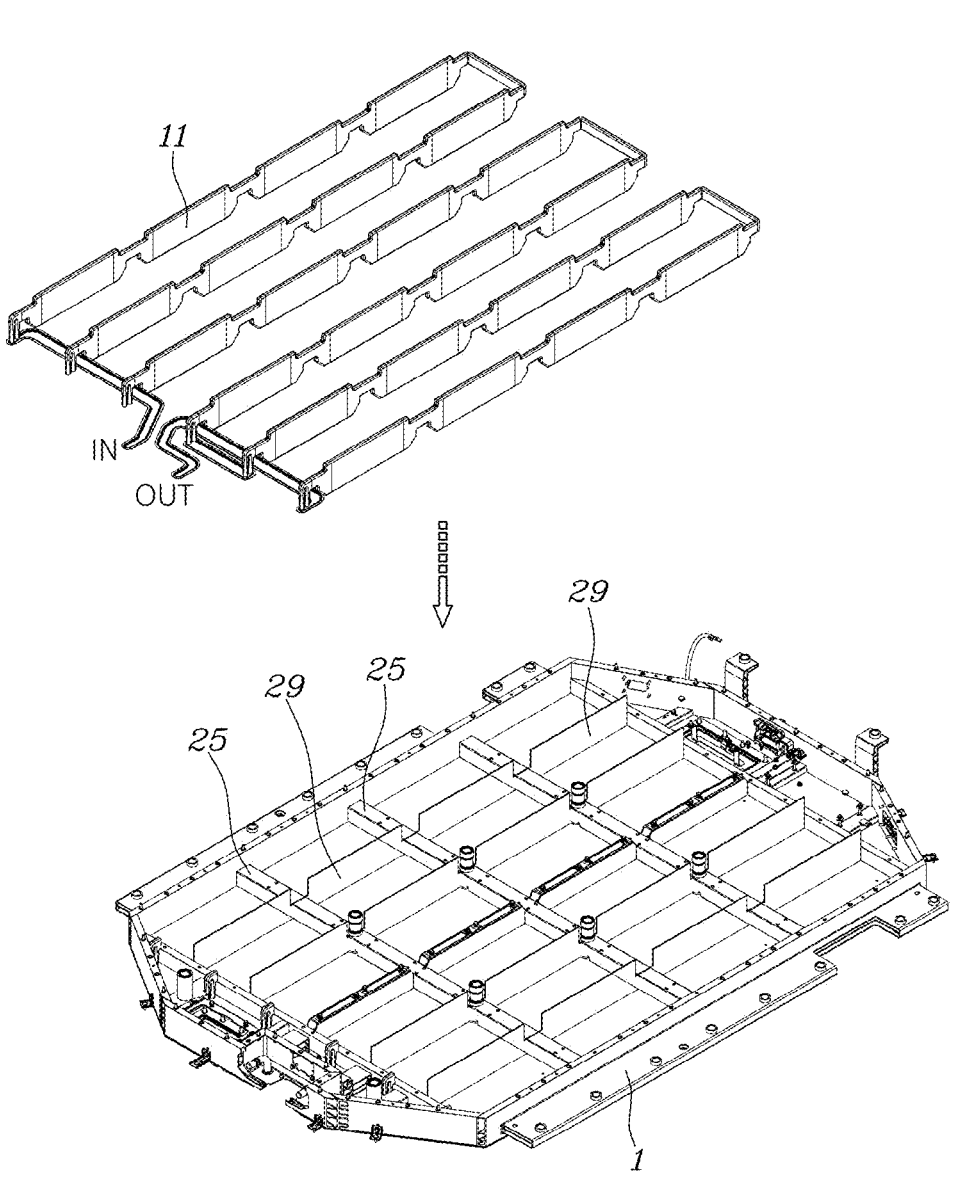
FIG. 1 is a view showing a state in which cooling channels are mounted to a pack tray in an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, the structural or functional description specified to exemplary embodiments according to the concept of the present disclosure is directed to describe the exemplary embodiments of the present disclosure, so it should be understood that the present disclosure may be variously embodied, without being limited to the exemplary embodiments of the present disclosure.

Embodiments described herein may be changed in various ways and various shapes, so specific embodiments are shown in the drawings and will be described in detail in the present specification. However, it should be understood that the exemplary embodiments according to the concept of the present disclosure are not limited to the exemplary embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent", or "directly adjacent" should be interpreted in the same manner as those described above.

The terminology used herein is for describing various exemplary embodiments only and is not intended to limit the present disclosure. Singular forms are intended to include plural forms unless the context clearly indicates otherwise. It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which an exemplary embodiment of the present disclosure belongs. It must be understood that the terms defined by the dictionary are identical with the meanings within the context of the related art, and they should not be ideally or excessively formally defined unless the context clearly dictates otherwise.

Hereinbelow, a various exemplary embodiments of the present disclosure will be described in detail with reference to accompanying drawings. The same reference numerals will be used throughout the drawings to refer to the same elements or parts.

Referring to FIGS. 1 to 16, the battery pack for a vehicle according to various exemplary embodiments of the present disclosure includes a pack tray 1 with an open upper surface; a plurality of battery cells 3 stacked in a vertical direction on the pack tray 1; a plurality of sensing blocks 7 each including cell bus-bars 5 connected to electrodes of the battery cells 3, and provided on the pack tray 1; and a pressure plate 9 configured to press upper surfaces of the stacked battery cells 3 in a downward direction thereof.

In other words, according to an exemplary embodiment of the present disclosure, the battery cells 3 are stacked upward in the pack tray 1, and the electrodes of the stacked battery cells 3 are respectively coupled to the cell bus-bars 5 of each of the sensing blocks 7, and surface pressures of the stacked battery cells 3 is generated by the pressure plate 9.

Therefore, instead of arranging a separate battery module for each battery cell as in the conventional case, the battery cells 3 are stacked and mounted directly to the pack tray 1. As the amount of the battery cells 3 substantially stored in the pack tray 1 is increased, ultimately an increase in the vehicle driving distance may be realized.

Figure 2:
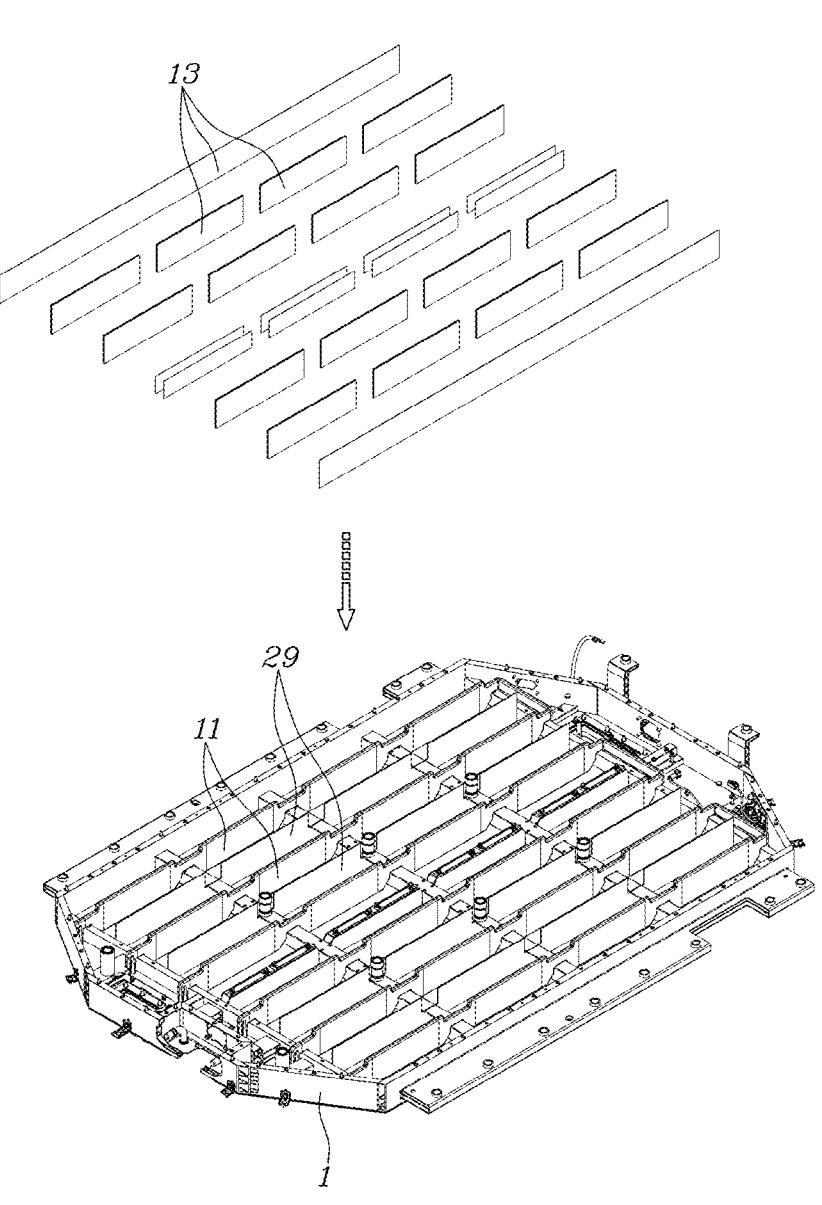
FIG. 2 is a view showing a state in which partition plates are attached to insulation sheets after the process of FIG. 1.
Figure 3:
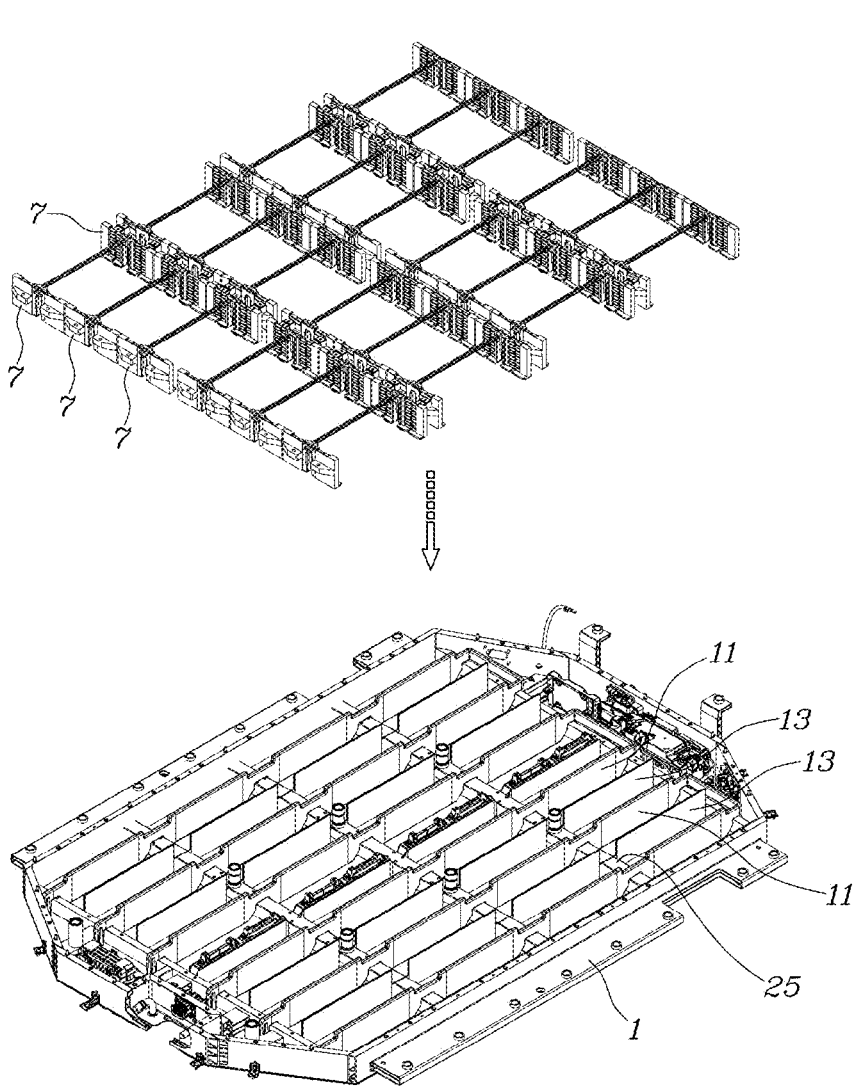
FIG. 3 is a view showing a state in which sensing blocks are assembled after the process of FIG. 2 and assembling a plurality of electric parts.
Figure 4:
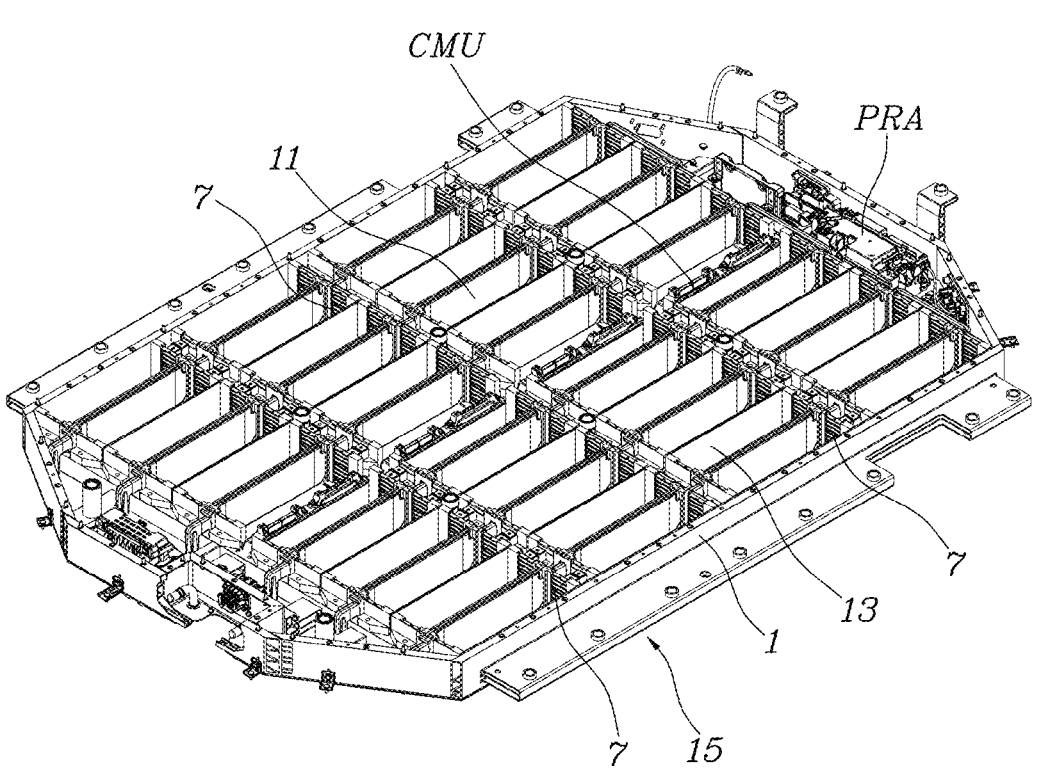
FIG. 4 is a view showing a pack tray assembly in which the processes from FIG. 1 to FIG. 3 has been completed.

FIG. 1, FIG. 2, and FIG. 3 are views showing a process in which cooling channels 11, insulation sheets 13, and the sensing blocks 7 are assembled to the pack tray 1 to form a pack tray assembly 15 as shown in FIG. 4. For reference, in addition to the above parts, electric parts such as a fuse, a cell monitoring unit (CMU), a power relay assembly (PRA), etc. may be mounted to the pack tray assembly 15 in advance.

Figure 11:
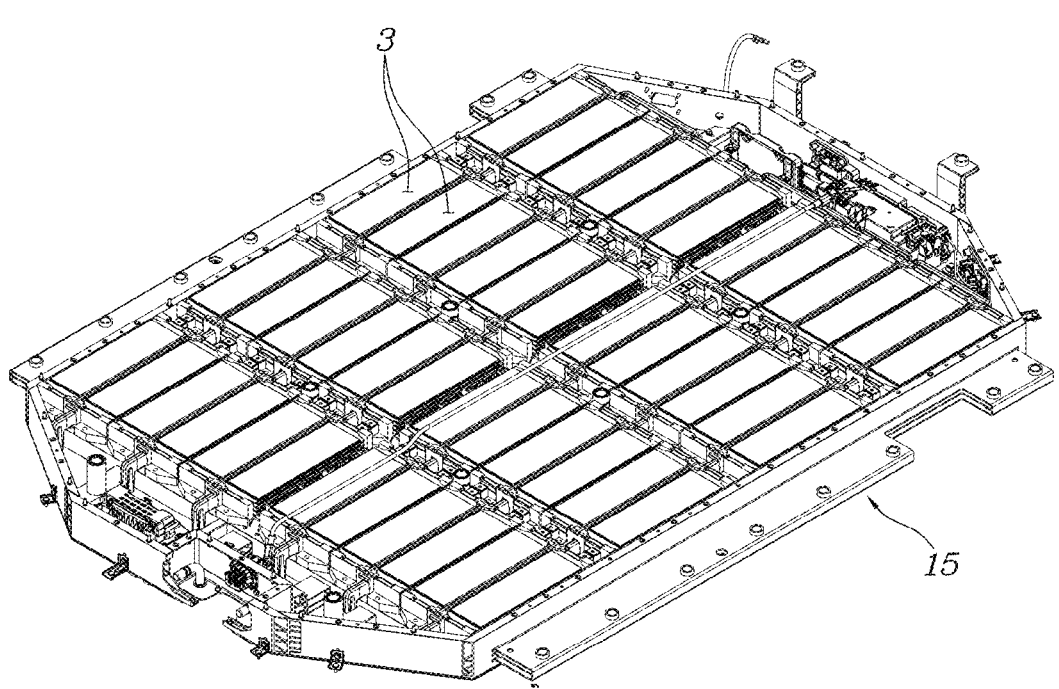
FIG. 11 is a view showing a state in which stacking of the battery cells to the pack tray assembly as shown in FIG. 4 has been completed.
Figure 16:
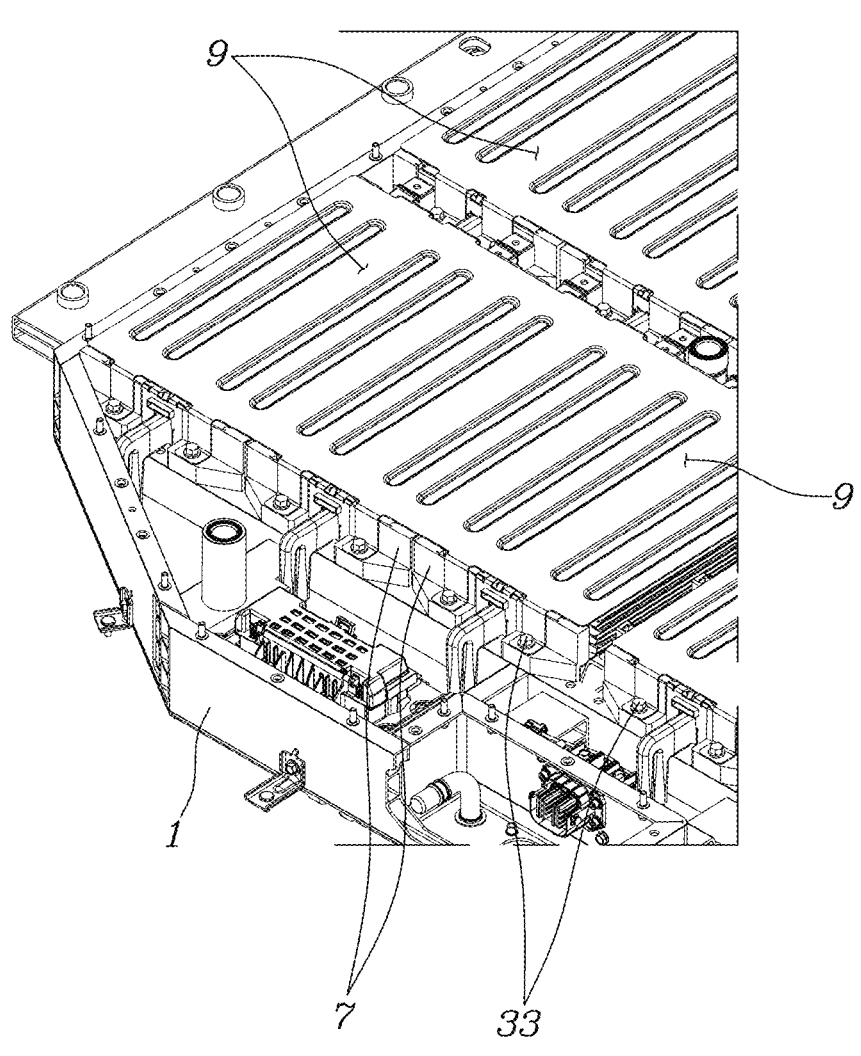
FIG. 16 is a view showing a state in which the pressure plate is assembled above the stacked battery cells as shown in FIG. 11 to apply pressure to the stacked battery cells.

The battery pack for a vehicle of the present disclosure is completed by stacking the battery cells 3 on the pack tray assembly 15 in FIG. 4 to form the state in FIG. 11, and then assembling the pressure plate 9 to form the state in FIG. 16, and then coupling an upper casing above the pressure plate 9 to cover the upper surface of the pack tray 1.

The plurality of cell bus-bars 5 of each of the sensing blocks 7 are arranged in the vertical direction; and to avoid interference with the stacked battery cells 3, each of the cell bus-bars 5 is deformed into a horizontal direction from an upward bent state, and then is coupled to an electrode of each of the battery cells 3.

However, among the cell bus-bars 5 of the sensing block 7, a lowest cell bus-bar 5 may be assembled to the pack tray 1 while protruding in the horizontal direction without being bent upward, as shown in the exemplary embodiment of the present disclosure.

In the process where the battery cells 3 are stacked and mounted, there is no battery cell 3 that passes through the lowest cell bus-bar 5 to move further downward and the electrode of the battery cell 3 stacked first is weld while being overlapped with the upper portion of the lowest cell bus-bar 5. Therefore, a process where the cell bus-bar 5 is unnecessarily bent upward and then deformed horizontally again is omitted by maintaining the lowest cell bus-bar 5 in the horizontally protruding state in advance, so that the ease of assembly of the battery cells 3 may be improved.

A spacer 17 is inserted into a gap between the cell bus-bars 5 that are deformed horizontally and coupled to the battery cells 3 to supply a support force in the vertical direction, and the spacer 17 is configured to facilitate an upper cell bus-bar 5 to be deformed horizontally and to solidly support the gap between the electrodes of the stacked battery cells 3.

Figure 12:
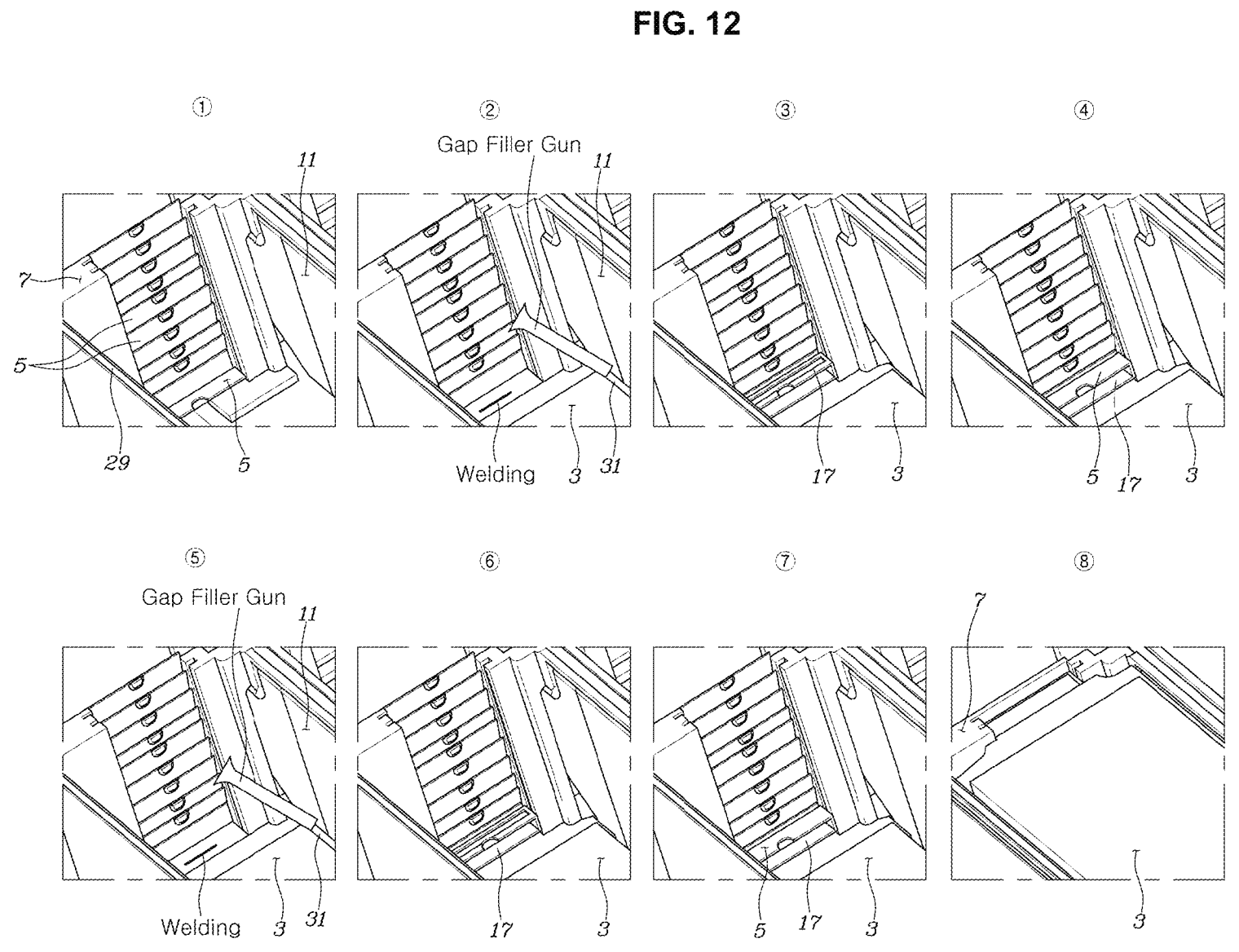
Figure 13:
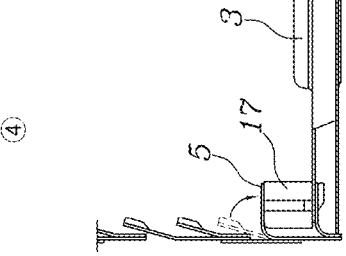
FIG. 13 is a side view showing the process from ① to ⑤ in FIG. 12.
Figure 13:
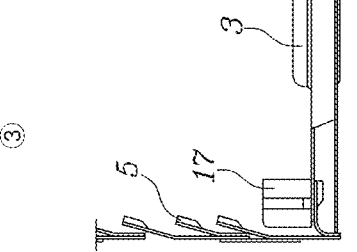
Figure 13:
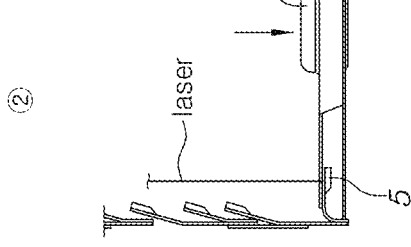
Figure 13:
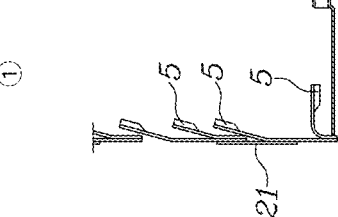
Figure 14:
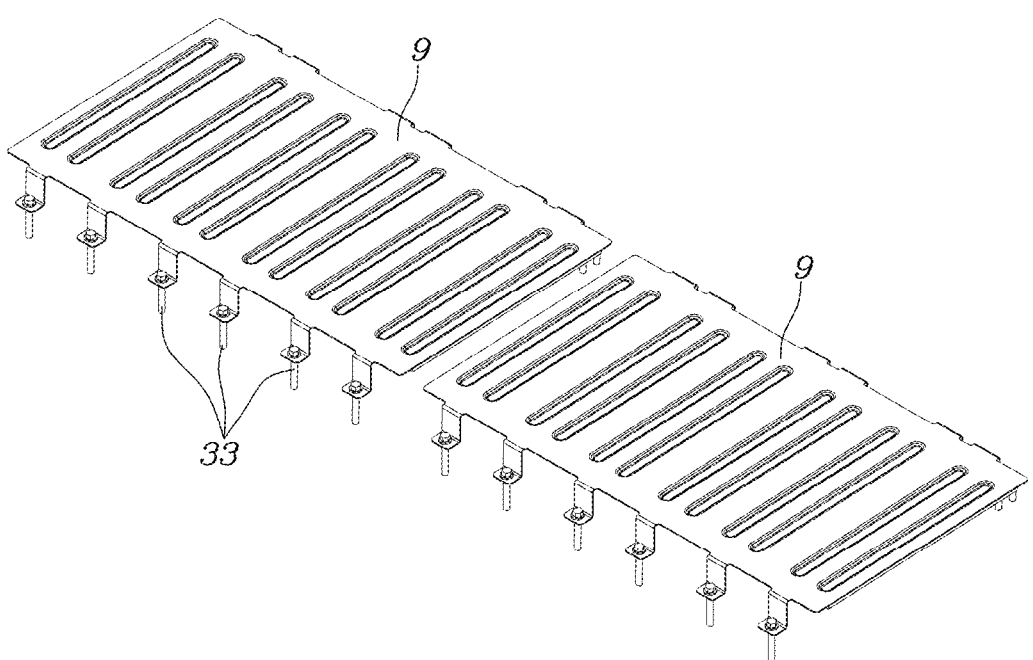
FIG. 14 is a view showing a pressure plate.
Figure 15:
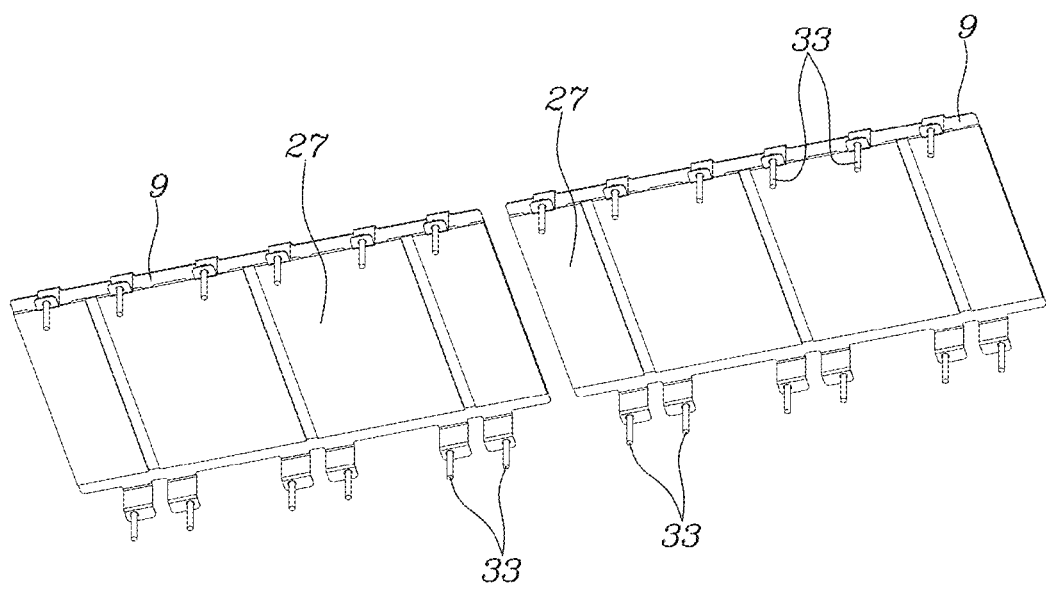
FIG. 15 is a view showing insulation plates at the lower side of the pressure plate shown in FIG. 14.

FIG. 12, and FIG. 13 are views showing a process where the battery cells 3 are stacked with each other while the electrodes of the battery cells 3 are weld on the cell bus-bars 5 of the sensing block 7 as described above.

In other words, in an initial state as shown in ①, the lowest cell bus-bar 5 remains in the horizontal state, and as shown in ②, an electrode of a first-located battery cell 3 is overlapped to the lowest cell bus-bar 5 and the electrode is coupled to the cell bus-bar 5 by laser welding, and as shown in ③, the spacer 17 is inserted above the upper portion of the battery cell 3 that has been coupled, as shown in ④, the cell bus-bar 5 is deformed horizontally, and then as shown in ⑤, a new battery cell 3 is stacked on the cell bus-bar 5, the electrode is weld on the cell bus-bar 5, and as shown in ⑥, the spacer 17 is inserted, and as shown in ⑦, the cell bus-bar 5 is deformed horizontally.

Herein, ⑧ is a view showing welding of the electrode of the top battery cell 3 is completed while all the battery cells 3 are stacked.

The sensing block 7 is arranged so that a pair of sensing blocks 7 are respectively arranged at opposite end portions each of two groups of battery cells 3 stacked adjacent to each other; and the pair of two sensing blocks 7 are configured to electrically couple the two groups of battery cells 3 to a pair of terminals 19.

Both the pair of terminals 19 are provided any one of the pair of two sensing blocks 7.

Figure 9:
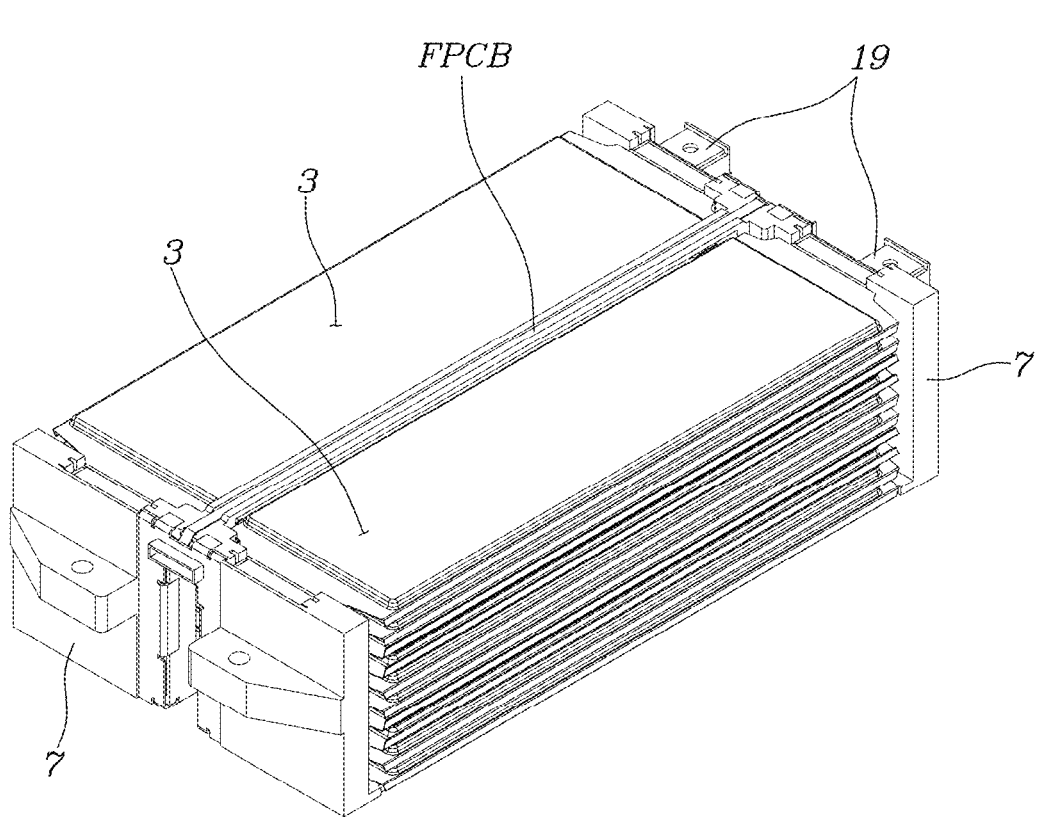
FIG. 9 is a view showing a state in which 2 groups of battery cells stacked with 10 layers are assembled to a pair of sensing blocks.

For example, as shown in FIG. 9, the two groups of 10-layers battery cells 3 are connected to the two sensing blocks 7 while being located therebetween, and both the pair of terminals 19 are provided at a right sensing block 7 of the pair of sensing blocks 7.

Figure 6:
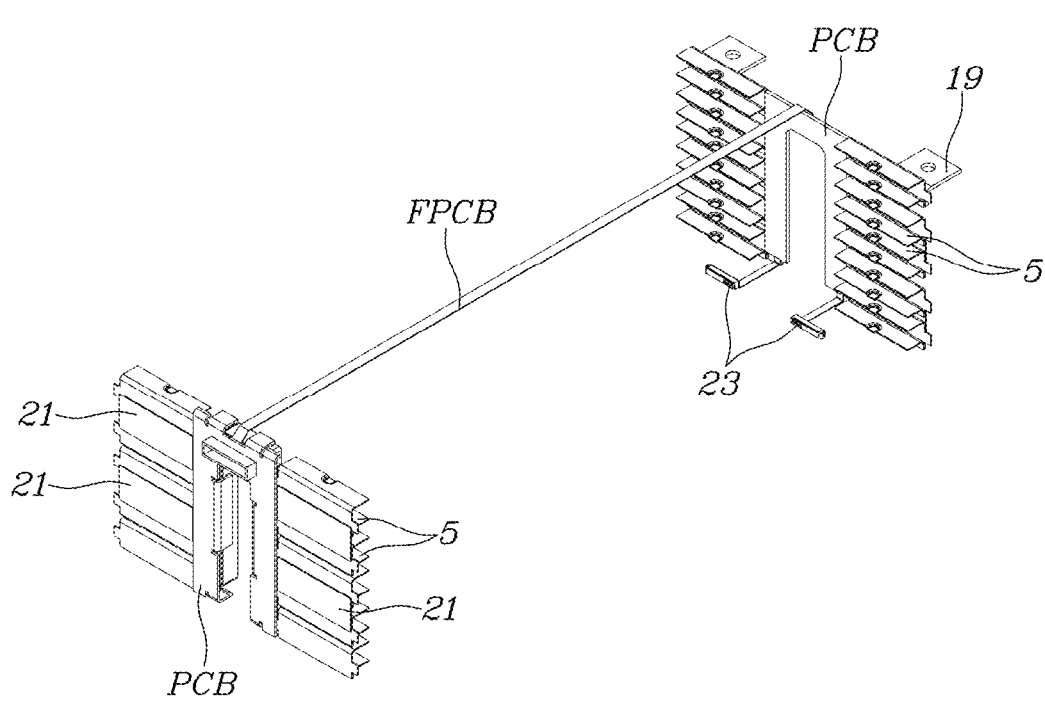
FIG. 6 is a view showing the sensing block in FIG. 5 without a sensing block housing.
Figure 7:
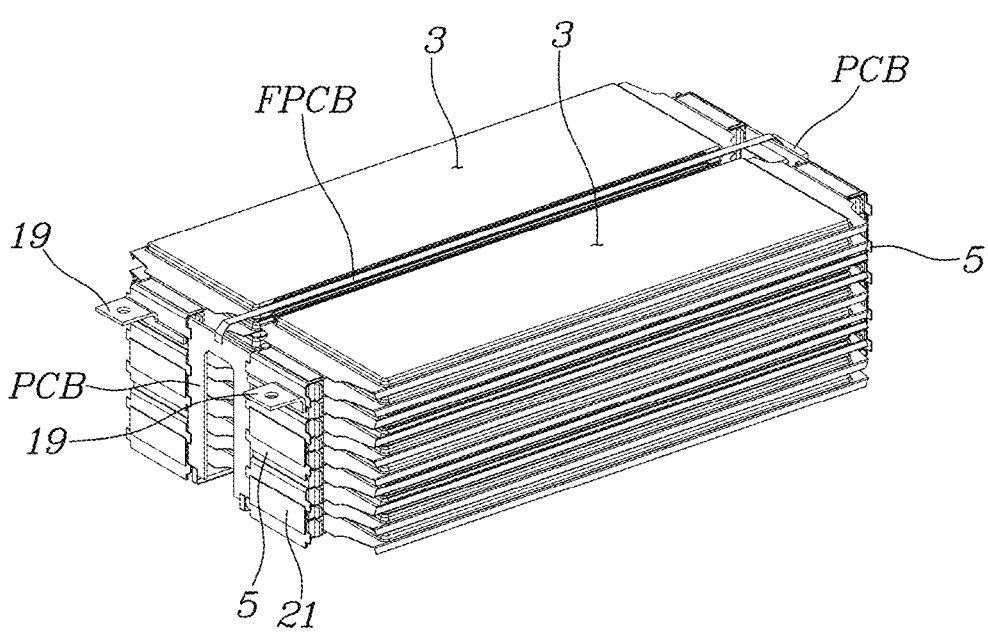
FIG. 7 is a view showing a state in which stacked battery cells and cell bus-bars are coupled to each other.
Figure 8:
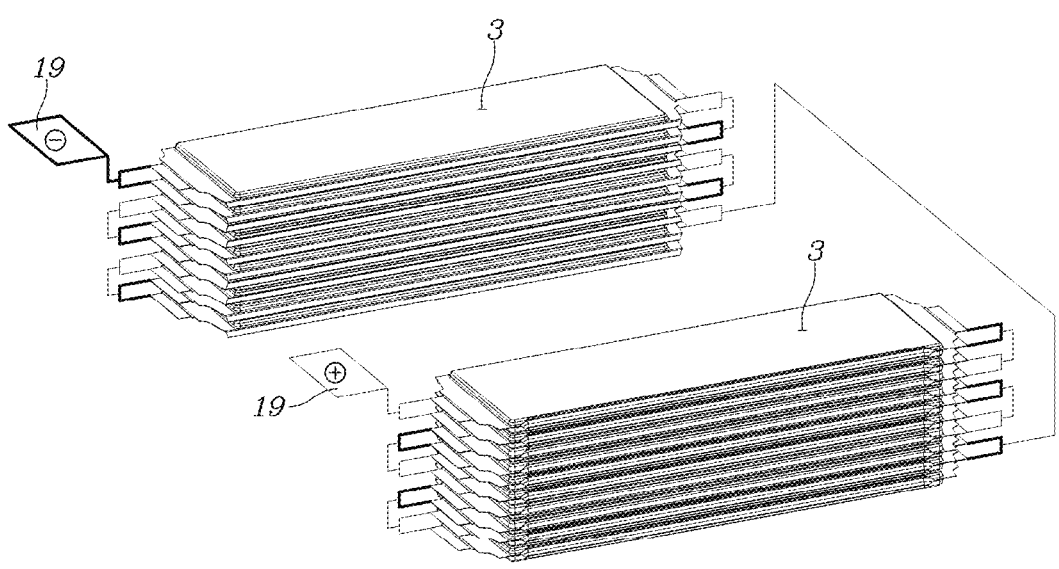
FIG. 8 is a view showing electrical connection between the stacked battery cells as shown in FIG. 7.

For reference, the electrical connection between the two groups of 10-layers battery cells 3 may be configured as shown in FIG. 8, and to generate the electrical connection as shown in FIG. 8, inter-cell connection bus-bars 21 may be respectively provided between the cell bus-bars 5 as shown in FIG. 6 and FIG. 7.

For reference, in FIG. 5, the cell bus-bars 5 and the inter-cell connection bus-bars 21 are covered with a sensing block housing 22, and a printed circuit board (PCB), which will be described below, is covered with a substrate cover 24.

Furthermore, a portion marked in relatively dark color in FIG. 8 means anodes of the battery cells 3.

Figure 5:
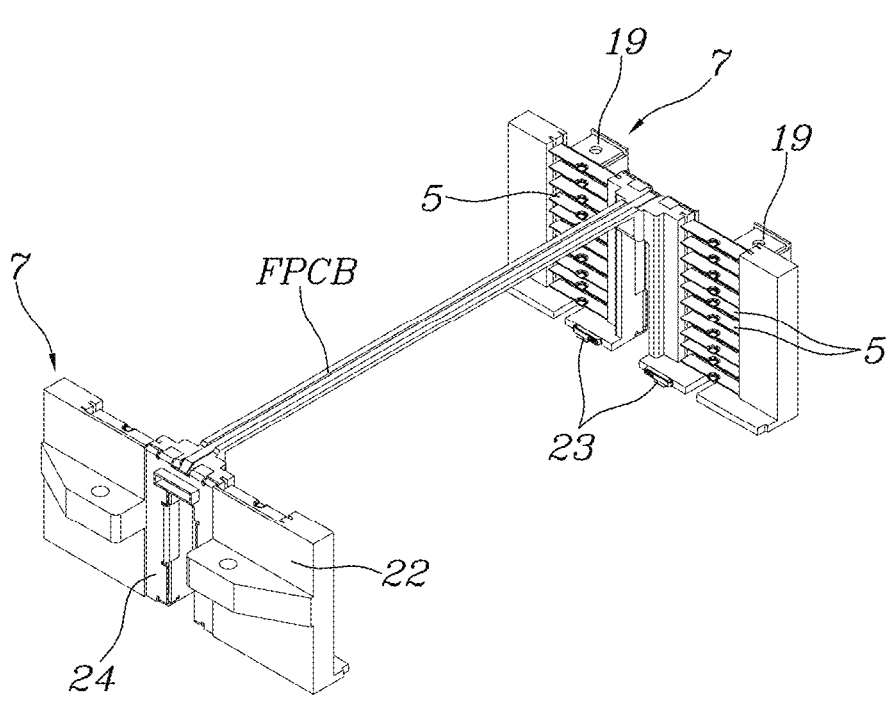
FIG. 5 is a detailed view showing each of the sensing blocks.
Figure 10:
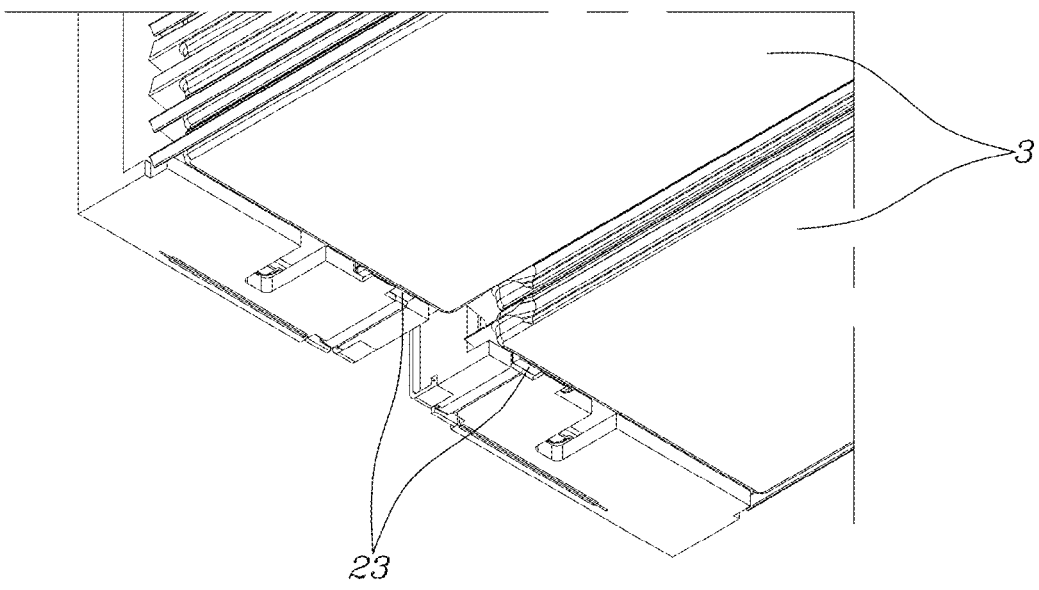
FIG. 10 is a view showing temperature sensors of the sensing blocks arranged to measure the temperature of the battery cells.

Meanwhile, at least one of the pair of two sensing blocks 7 may include a temperature sensor 23 to measure the temperature of the battery cells 3, referring to FIGS. 5, 6, and 10.

A wiring member that enable to transmit an electrical signal connects the pair of two sensing blocks 7 to each other while being located therebetween.

According to the exemplary embodiment of the present disclosure, the wiring member connecting the pair of two sensing blocks 7 to each other is a flexible printed circuit board (FPCB); and PCBs are respectively provided at the pair of two sensing blocks 7 to be connected to the FPCB.

Of course, the wiring member may include a plurality of simple cables, etc. other than the FPCB.

The pack tray 1 includes a plurality of support members 25 to fix the sensing blocks 7; and the pressure plate 9 is located above the sensing blocks 7 and fixed to the support members 25 with the sensing blocks 7.

In other words, because the pressure plate 9 and the sensing blocks 7 are fixed to the support members 25 at the same time, the assembly workability is improved.

The pressure plate 9 includes a metal plate; and insulation plates 27 are provided at a lower surface of the pressure plate 9 to be brought into contact with the battery cells 3.

The insulation plates 27 may include a plastic injection casting, etc.

Therefore, the pressure plate 9 may apply sufficient surface pressure to the stacked battery cells 3, and prevent the insulation plates 27 and the battery cells 3 from generating electrical problem due to a contact thereof.

On the pack tray 1, to partition the stacked battery cells 3 in a direction perpendicular to the support members 25, a plurality of partition plates 29 and the cooling channels 11 are alternately provided.

The insulation sheets 13 are attached to the partition plates 29 of the pack tray 1; and a gap filler 31 is filled into each gap between the cooling channels 11 and the battery cells 3.

Therefore, the battery cells 3 stored in the stacked state in the pack tray 1 remain in the mechanically or electrically stable state while being partitioned from each other in a space defined by the partition plates 29, the cooling channels 11, and the sensing blocks 7, and sufficient cooling may be performed continuously via the cooling channels 11.

Referring to FIG. 12, a state in which the gap filler 31 is filled into gaps between the battery cells 3 and the cooling channels 11 as described above is shown in ② and ⑤.

Therefore, the stacked battery cells 3 can secure sufficient heat exchange with refrigerant flowing in the cooling channels 11.

Figure 17:
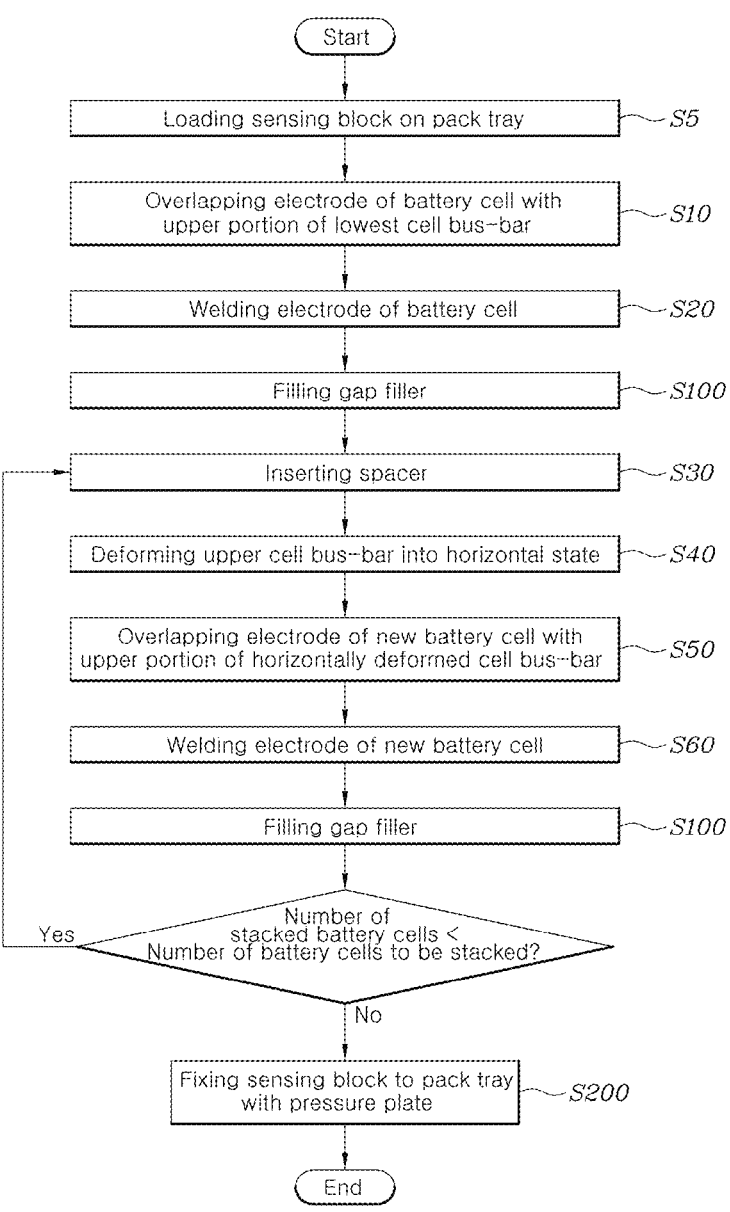
FIG. 17 is a flowchart showing a method for manufacturing the battery pack for a vehicle according to various exemplary embodiments of the present disclosure.
Figure 18:
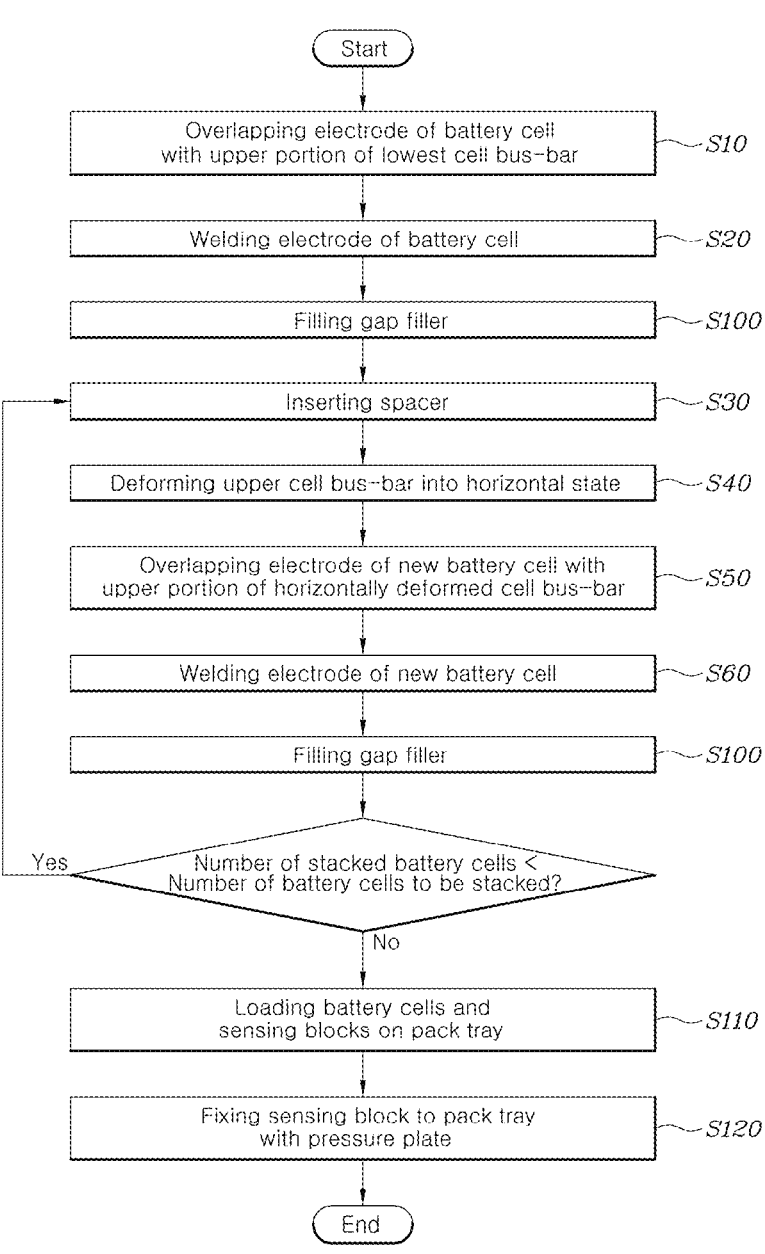
FIG. 18 is a flowchart showing a method for manufacturing the battery pack for a vehicle according to various exemplary embodiments of the present disclosure.

Referring to FIGS. 17 and 18, according to exemplary embodiments of the present disclosure, a method for manufacturing the battery pack for a vehicle includes in common: loading the battery cell 3 so that the electrode of the battery cell 3 is overlapped with the upper portion of the lowest cell bus-bar 5 of the sensing block 7 at S10; welding the electrode of the loaded battery cell 3 to the lowest cell bus-bar 5 at S20; inserting the spacer 17 above the welded electrode at S30; deforming the cell bus-bars 5 directly above the welded cell bus-bars 5 into the horizontal state at S40; stacking another battery cell 3 so that an electrode of the another battery cell 3 is overlapped with an upper portion of the horizontally deformed cell bus-bar 5 at S50; and welding the electrode of the newly loaded battery cell 3 to the lower cell bus-bar 5 at S60.

The processes from the inserting the spacer 17 at S30 to the welding the electrode of the newly loaded battery cell 3 to the lower cell bus-bar 5 at S60 are repeatedly performed in response to the number of the battery cells 3 to be additionally stacked.

After the electrode of the battery cell 3 is welded to the lower cell bus-bar 5 and before a new battery cell 3 is stacked, filling the gap filler 31 into a gap between the battery cell 3 with the welded electrode and the cooling channels 11 at S100 may be performed.

According to various exemplary embodiments shown in FIG. 17, before the loading the battery cell 3 so that the electrode of the battery cell 3 is overlapped with the upper portion of the lowest cell bus-bar 5 of the sensing block 7, loading the sensing block 7 on the pack tray 1 is performed first at S5.

In other words, as shown in FIG. 3, the work of loading the sensing block 7 on the pack tray 1 is performed first, and then in the state of the pack tray assembly 15 as shown in FIG. 4, the battery cells 3 are coupled to the sensing blocks 7 while being stacked sequentially therebetween.

When welding the electrodes of all the battery cells 3 additionally stacked to the cell bus-bars 5 is completed, the pressure plate 9 provided to press the stacked battery cells 3 in the downward direction is located above the battery cells 3, and then a fixing bolt 33 passing through the pressure plate 9 and the sensing blocks 7 sequentially is securely coupled to the support members 25 the pack tray 1 at S200 as the state in FIG. 16, and then the upper casing is coupled thereto, and thus the assembling of the battery pack for a vehicle according to an exemplary embodiment of the present disclosure is completed.

Meanwhile, according to various exemplary embodiments in FIG. 18, when welding the electrodes of all the additionally stacked battery cells 3 to the cell bus-bars 5 is completed, the method of manufacturing the battery pack for a vehicle includes: loading the assembly of the stacked battery cells 3 and the sensing blocks 7 on the pack tray 1 at S110; and fixing the sensing blocks 7 to the pack tray 1 at S120.

In other words, according to the various exemplary embodiments of the present disclosure, after coupling between the sensing blocks 7 and the stacked battery cells 3 is completed outside the pack tray 1 as shown in FIG. 9, the loading the assembly on the pack tray 1 is performed at S110, and then the fixing the sensing blocks 7 is performed at S120.

The fixing the sensing blocks 7 to the pack tray 1 at S120 is performed by locating the pressure plate 9 provided to press the stacked battery cells 3 in the downward direction above the battery cells 3, and then by securely coupling the fixing bolt 33 to the support members 25 of the pack tray 1, the fixing bolt 33 being passing through the pressure plate 9 and the sensing blocks 7 sequentially.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery pack for a vehicle, the battery pack comprising:

a pack tray including an open upper surface;

a plurality of battery cells stacked in a vertical direction on the pack tray;

a plurality of sensing blocks, each including a cell bus-bar connected to an electrode of each of the battery cells, and provided on the pack tray; and a pressure plate mounted to press upper surfaces of the stacked battery cells in a downward direction thereof, wherein the pack tray includes a plurality of support members fixing the plurality of sensing blocks, and wherein the pressure plate is fixed to the support members with the plurality of sensing blocks and is located above the plurality of sensing blocks.

2. The battery pack of claim 1, wherein the cell bus-bar of each of the sensing blocks includes a plurality of cell bus-bars arranged in the vertical direction, and wherein to prevent each of the cell bus-bars from interfering with the stacked battery cells, each of the cell bus-bars is deformed into a horizontal direction from an upward bent state, and then is coupled to an electrode of each of the battery cells.

3. The battery pack of claim 2, wherein among the cell bus-bars of each of the sensing blocks, a lowest cell bus-bar is assembled to the pack tray in a horizontally protruding state without being bent upwards.

4. The battery pack of claim 2, wherein a spacer is inserted between the cell bus-bars, which are horizontally deformed and respectively coupled to the battery cells, to supply a support force in the vertical direction.

5. The battery pack of claim 1, wherein the plurality of sensing blocks are arranged so that a pair of sensing blocks are arranged at opposite end portions of two groups of the stacked battery cells, the two groups being arranged adjacent to each other, and wherein the pair of sensing blocks electrically connect the two groups of the battery cells to a pair of terminals, respectively.

6. The battery pack of claim 5, wherein the pair of terminals are provided at one of a pair of two sensing blocks among the plurality of sensing blocks.

7. The battery pack of claim 5, wherein a temperature sensor is provided at least one of a pair of two sensing blocks among the plurality of sensing blocks to measure a temperature of the plurality of battery cells.

8. The battery pack of claim 5, wherein a wiring member configured for transmitting an electrical signal connects the pair of two sensing blocks to each other while being located therebetween.

9. The battery pack of claim 8, wherein the wiring member connecting the pair of two sensing blocks to each other is a flexible printed circuit board (FPCB), and wherein the pair of two sensing blocks respectively include printed circuit boards (PCB) connected to the FPCB.

10. The battery pack of claim 1, wherein the pressure plate includes a metal plate; and wherein insulation plates are provided on a lower surface of the pressure plate to be in contact with the plurality of battery cells.

11. The battery pack of claim 1, wherein on the pack tray, to partition the stacked battery cells in a perpendicular direction to the support members, a plurality of partition plates and cooling channels are alternately provided.

12. The battery pack of claim 11, wherein insulation sheets are attached to the partition plates of the pack tray; and wherein a gap filler is filled into a gap between the cooling channels and the battery cells.

* * * * *